US007461250B1

(12) United States Patent
Duane et al.

(10) Patent No.: US 7,461,250 B1
(45) Date of Patent: Dec. 2, 2008

(54) SYSTEM AND METHOD FOR CERTIFICATE EXCHANGE

(75) Inventors: William M. Duane, Westford, MA (US); Peter Röstin, Tyresö (SE)

(73) Assignee: RSA Security, Inc., Bedford, MA (US)

( * ) Notice: Subject to any disclaimer, the term of this patent is extended or adjusted under 35 U.S.C. 154(b) by 0 days.

(21) Appl. No.: 09/359,205

(22) Filed: Jul. 22, 1999

(51) Int. Cl.
*H04L 9/00* (2006.01)
*H04L 9/32* (2006.01)

(52) U.S. Cl. .................. 713/157; 713/158; 713/168; 713/173; 713/175; 713/176; 713/180; 713/182; 726/10

(58) Field of Classification Search ................ 713/157, 713/156
See application file for complete search history.

(56) References Cited

U.S. PATENT DOCUMENTS

| | | | | | |
|---|---|---|---|---|---|
| 4,868,877 | A | | 9/1989 | Fischer | 380/25 |
| 5,220,603 | A | * | 6/1993 | Parker | 380/21 |
| 5,220,604 | A | * | 6/1993 | Gasser et al. | 707/9 |
| 5,475,753 | A | * | 12/1995 | Barbara et al. | 380/4 |
| 5,497,422 | A | * | 3/1996 | Tysen et al. | 713/157 |
| 5,604,804 | A | | 2/1997 | Micali | 380/25 |
| 5,606,617 | A | * | 2/1997 | Brands | 380/30 |
| 5,666,416 | A | * | 9/1997 | Micali | 380/23 |
| 5,745,574 | A | | 4/1998 | Muftic | 380/23 |
| 5,768,519 | A | | 6/1998 | Swift et al. | 395/200.53 |
| 5,774,552 | A | * | 6/1998 | Grimmer | 713/156 |
| 5,787,172 | A | | 7/1998 | Arnold | 380/21 |
| 5,867,578 | A | * | 2/1999 | Brickell et al. | 713/180 |
| 5,903,882 | A | * | 5/1999 | Asay et al. | 705/44 |
| 5,960,083 | A | * | 9/1999 | Micali | 713/175 |
| 5,982,898 | A | * | 11/1999 | Hsu et al. | 713/156 |
| 6,058,383 | A | * | 5/2000 | Narasimhalu et al. | 705/44 |
| 6,097,811 | A | * | 8/2000 | Micali | 713/186 |
| 6,233,577 | B1 | * | 5/2001 | Ramasubramani et al. | 707/9 |
| 6,233,685 | B1 | * | 5/2001 | Smith et al. | 713/194 |
| 6,321,333 | B1 | * | 11/2001 | Murray | 713/156 |
| 6,367,009 | B1 | * | 4/2002 | Davis et al. | 713/166 |
| 6,513,116 | B1 | * | 1/2003 | Valente | 713/155 |

(Continued)

FOREIGN PATENT DOCUMENTS

GB 2382501 A * 5/2003

(Continued)

OTHER PUBLICATIONS

Anonymous, X. 509 Certificates and Certificates Revocation Lists (CRLs), May 20, 1998, pp. 1-5.*

(Continued)

*Primary Examiner*—Ayaz Sheikh
*Assistant Examiner*—Aravind K Moorthy
(74) *Attorney, Agent, or Firm*—BainwoodHuang

(57) ABSTRACT

In an embodiment of a system and method according to the present invention, a chain of one or more certificates certifying a principal's public key is exchanged for a single substitute certificate. The substitute certificate is used as a replacement for the certificate chain. The substitute certificate is useful for authentication of the principal. In one embodiment, an authentication server exchanges the certificates. The substitute certificate is signed by the authentication server and used for authentication and communication with principals that have knowledge of and trust the authentication server. In one embodiment the substitute certificate also includes the principal's access information.

19 Claims, 9 Drawing Sheets

U.S. PATENT DOCUMENTS

| | | | |
|---|---|---|---|
| 6,532,540 B1 * | 3/2003 | Kocher | 713/158 |
| 6,564,319 B1 * | 5/2003 | Peters et al. | 713/156 |
| 6,766,450 B2 * | 7/2004 | Micali | 713/158 |
| 6,823,454 B1 * | 11/2004 | Hind et al. | 713/168 |
| 6,826,690 B1 * | 11/2004 | Hind et al. | 713/186 |
| 6,981,147 B1 * | 12/2005 | Hamann et al. | 713/175 |

FOREIGN PATENT DOCUMENTS

| | | |
|---|---|---|
| WO | WO 98/49805 | 11/1998 |
| WO | WO 99/35783 | 7/1999 |
| WO | WO 2008013525 A1 * | 1/2008 |

OTHER PUBLICATIONS

Levi et al, Use of Nested Certificates for Efficient, Dynamic, and Trust Preserving Public Key Infrastructure, 2004, ACM, pp. 21-59.*

Huang et al, An Approach to Certificate Path Discovery in Mobile Ad Hoc Networks, 2003, ACM, pp. 41-53.*

Dhakal et al, Optimal Dispersal of Certificate Chains, 2007, IEEE, pp. 474-484.*

Li et al, Recovery mechanism of online certification chain in grid computing, 2006, IEEE, pp. 1-5.*

Adams, C. et al. "Internet X-509 Public Key Infrastructure Data Certification Server Protocols <draft-ietf-pkix-dcs-00.txt>," http://www.ietf.org/internet-drafts/drafts-ietf-pkix-dcs-00.txt, Sep. 23, 1998, printed May 19, 1999, 13 pgs.

Farrell, S. et al. "An Internet Attribute Certificate Profile for Authorization <draft-ietf-pkix-ac509prof-00.txt>," http://www.ietf.org/internet-drafts/draft-ietf-pkix-ac509prof-00.txt, Apr. 1999, printed May 21, 1999. 28 pgs.

Housley, R. et al. "Internet X.509 Public Key Infrastructure Certificate and CRL Profile," ftp://ftp.isi.edu/in-notes/rfc2459.txt, Jan. 1999, printed Jun. 15, 1999, 113 pgs.

Linn, J. "Practical Authentication for Distributed Computing," 1990 IEEE Symposium on Research in Security and Privacy, May 7, 1990, pp. 31-40.

Santesson, S. Internet X.509 Public Key Infrastructure Qualified Certificates <draft-ietf-pkix-qc-00.txt>, http://www.ietf.org/internet-drafts/draft-ietf-pkix-qc-00.txt, Feb. 3, 1999, printed Jun. 15, 1999. 19 pgs.

PRBAC Applications. Enterprise Security Applications of Partition Rule Based Access Control (PRBAC), http://www.anassoc.com/prbac%20home/PRBACapp.html, printed May 19, 1999, 14 pgs.

FPDAM on Certificate Extensions. Final Proposed Draft Amendment on Certificate Extensions (V6), Collaborative ITU and ISO/IEC meeting on the Directory, Orlando, Florida, USA, Apr. 1999, 62 pgs.

Chokhani, Santosh, "Toward a National Public Key Infrastructure," *IEEE Communications Magazine*, US, IEEE Serice Center, Piscataway, NJ, vol. 32, No. 9, Sep. 1, 1994, pp. 70-74.

Patent Cooperation Treaty, International Search Report, International Application No. PCT/US00/19654, mailed on Dec. 7, 2000, 7 pages.

* cited by examiner

SYSTEM AND METHOD FOR CERTIFICATE EXCHANGE

TECHNICAL FIELD

This invention relates to the field of computer security and authentication and, more particularly, to a method and system for exchanging authentication certificates.

BACKGROUND INFORMATION

Certificates are used in the field of computer security, and often are included in public/private key cryptography-based systems. An example of public/private key cryptography is RSA public/private key cryptography. Computer security systems generally involve people or machines establishing their identity (authenticating) and communicating with other people or machines. Throughout this document, each user, server, node, computer, machine, system, entity, and so on participating in a security system is referred to as a principal. The use of this general term is intended to simplify the differences between participants and devices acting as their agents and to more clearly describe the interaction of the principals, whether they are humans or machines, or machines acting on the behalf of humans.

Generally, a principal's public key is publicly accessible. In some systems, all public keys are placed in one public place, such as on a server, or published, for example in a newspaper or in an electronic publication. But when all principals' keys are provided on a server or published with no other cryptographic protection, a principal cannot be sure that the published information is correct. An intruder might have overwritten the information in the server or replaced the published newspaper with a copy containing different information. If an intruder ("Irving") can trick a principal Alice into believing that Irving's public key is principal Joe's public key, then Irving can impersonate Joe to Alice.

Authentication certificates are included in a security system to make it more difficult for an intruder to impersonate a principal. Authentication certificates are messages that specify a principal's name (i.e. Alice), the public key associated with that name (i.e. Alice's public key), and possibly other information. Certificates are digitally signed with a principal's private key. A digital signature is a cryptographic technique that allows a principal who knows the signer's public key to verify that the message was "signed" with the matching private key, meaning that the message came from the signer and that the message is intact.

In some systems, a principal known as a Certification Authority ("CA") generates and issues authentication certificates. The certificates are signed with the CA's private key. In such systems, principals are somehow provided, for example systems can be pre-configured, with the CA's public key. All principals who know the CA's public key can verify the CA's signature on the certificates, and thereby determine that the certificates are intact (i.e. have not been tampered with) and that the signed certificate originates from the signer. Certificates can be stored in any convenient location, such as a directory service, or a principal can store its own certificate and furnish it as part of an authentication procedure. Certificates are relatively secure, because an intruder cannot modify them.

In such a system, it may become necessary to revoke a certificate, for example because a private key has been compromised, to revoke a user's privileges, or for other reasons. It is common practice to put an expiration date in a certificate, after which the certificate is invalid. It is also known (for example it is specified in the X.509 standard) for a certificate issuer to distribute or make available a certificate revocation list ("CRL"). A CRL includes a list of serial numbers of unexpired, revoked certificates and an issue time for the CRL. In such a system, a certificate is valid if it has a valid signature, has not expired, and is not listed in the issuer's most recent CRL. The use of a CRL adds overhead to the verification of a certificate, in that it requires the verifying system to obtain and check the CRL for the appearance of the certificate being validated.

A security system that uses a single CA that issues certificates requires that all principals trust and interact with the single CA. As the number of principals increases, this is often not possible. In some systems, a network is divided into domains. Each domain has a CA that services that domain's principals, and issues certificates for those principals. Each principal in a domain is provided with the public key of her domain's CA, and can thus verify certificates signed by her domain's CA. Principals communicating within the same domain operate as just described, verifying certificates signed by their domain's CA. But principals in different domains also need a way to verify the other principals' public keys.

It might be possible to provide all principals with the public keys for all CA's, however, it can be expensive, and is often impractical, for each principal to keep up-to-date as domains and CA's are added and removed from the system. Another solution is to have the CA in each domain be provided with the public keys for the CA's in each other domain. The CA can issue certificates that verify the public keys of the other domain. A principal communicating with a principal in another domain obtains a certificate from that other domain that is signed by the CA from the other domain. To verify the certificate signed by the other domain's CA, the principal obtains a certificate from his CA that certifies the public key of the other domain's CA.

Referring to FIG. 1 as an example, a principal Alice 1 in DOMAIN-A 10 wishes to authenticate or to communicate securely with a principal Bob 2 in DOMAIN-B 11. Bob 2 sends Alice 1 a certificate 20 certifying Bob's public key. Bob's certificate 20 is signed 21 by the DOMAIN-B CA. Alice 1 also obtains from Bob 2 or elsewhere (for example the DOMAIN-A CA), a certificate 25 for the DOMAIN-B CA signed 26 by the DOMAIN-A CA. This certificate contains the Domain-B CA's public key, and is signed by the Domain-A CA. Alice 1 can verify the DOMAIN-B CA's certificate 25, since Alice 1 knows the DOMAIN-A CA's public key. The verification process can include checking the CRL issued by the DOMAIN-A CA to determine that the certificate 25 certifying the DOMAIN B CA's public key has not been revoked. Once Alice 1 verifies DOMAIN-B CA's certificate 25, Alice 1 then "knows" the public key of the DOMAIN B CA. Alice 1 can verify Bob's certificate 20, by verifying that the certificate 20 was signed with the DOMAIN B CA's private key, and by checking the DOMAIN B CA's CRL to determine that Bob's certificate 20 has not been revoked.

Thus, as shown in the example of FIG. 1, the knowledge that Alice 1 has of her domain's CA's public key is used to verify certificates signed by other principals. In this example, Alice's domain's CA signed a certificate 25 containing the public key of another CA, which signed a certificate certifying Bob 2. This is a simple example of a certificate chain, in that Alice can authenticate or communicate with Bob 2 by verifying first the DOMAIN-B CA's certificate, and then the certificate 20 signed by the DOMAIN-B CA. A certificate chain can have any number of intermediary CA's. A certificate chain can be used for authentication or communication when the chain starts with a certificate including the public key of the desired communication or authentication partner, and ends with a certificate signed with a known public key.

Various types of security systems are known that use certificate chains. One such security system involves a hierarchy of CAs in which each principal is initially provided with the public key of a CA that is at the top of the hierarchy. Each CA below the top is verified by a certificate signed by the CA above it in the hierarchy, and so on. The principal trusts a certificate because it can follow the certificate signatures back to the top CA or other trusted root. Another system, referred to as a web of trust, doesn't use "official" CAs, and relies on principals to issue certificates for other principals. A principal who knows the public key of another principal, and trusts that other principal, can rely on a certificate signed by that principal to get the public key of a third principal. That third principal can sign a certificate with the public key of another principal, and so on. The principal verifies each certificate in the certificate chain from the person he wishes to communicate with to the person he trusts.

In the various systems, a first principal that wishes to verify a second principal's public key from a certificate chain verifies each certificate in the certificate chain from the principal to a trusted entity. This can be a time consuming process, since it can involve numerous public key cryptographic operations. In systems that use CRL's, this process is especially time consuming, because it requires obtaining the most recent CRL from each certificate-issuing entity. In some systems this overhead is incurred repeatedly as the same principal is repeatedly authenticated by the same principal, or by different principals within a subnetwork, or by principals within a domain, and so on, since each authenticating principal repeatedly verifies each certificate in the chain.

Referring to FIG. 2, which shows an example of a typical system of the prior art, a principal 40 has a chain of certificates 42 that can be used to verify the principal's 40 public key, and thereby enable authentication or secure communication with the principal 40. Each certificate in the chain of certificates 42 can be obtained from the same or different sources. To establish the identity of the principal 40 with other principals, in this example hosts 43A, 43B, 43C, generally 43, the principal 40 communicates the certificate chain 42 to each host 43. Each host 43 processes each certificate in the chain 42 to validate certificate format, lifetime, and other data 45. In addition, each host 43 accesses the Certificate Revocation List ("CRL") 48 for each certificate in the chain. Also, each host 43 needs to maintain information 46 about principals that it trusts to have signed the last certificate in a chain (e.g. a list of CA's), referred to as trusted roots. The maintenance of a trusted root certificate list can be burdensome, because it requires that each, host be provided with the trusted root information in a secure manner.

SUMMARY OF THE INVENTION

Referring to FIG. 3, in an embodiment of the invention, the principal 40, like the principal 40 of FIG. 2, has a chain of certificates 42, which include the certificate of the principal 40, and certificates certifying the signer of principal's certificate, and so on. In this embodiment according to the invention, the certificate chain 42 is not processed by each host, rather, the certificate chain 42 is processed by a third party principal 55. The third party 55 is trusted by the hosts 43. The third party 55 processes each certificate in the chain chain 42, to validate certificate format, lifetime, and other data 45. The third party 55 verifies the CRL list 48, and verifies that the signer of the first certificate in the chain is in the trusted root list 46. After verifying the certificate chain 42, the trusted third party issues a short-lived replacement certificate 56, which may or may not contain other information such as access control information. The replacement certificate 56 is signed by the trusted third party 55. The replacement certificate 56 is communicated to the hosts 43, for example by the principal 40, by the trusted third party 55, or by publication or other method.

The replacement certificate 56, and not the certificate chain 42, is used by the hosts 43 to authenticate or communicate with the principal 40, because it provides a way for each host to verify the principal's 40 public key. The certificate chain 42, which is computationally complex to authenticate and requires CRL checking and trusted root verification, is verified once by the trusted third party 55, and not repeatedly by each host 43. In one embodiment, the replacement certificate is short-lived, and therefore the hosts need to perform only verification of a single certificate, without CRL checking, and without needing to maintain a set of trusted root table entries. This allows the host's 43 security implementation to be significantly simpler.

In an embodiment of a system and method according to the present invention, a chain of one or more certificates certifying a principal's public key is exchanged for a single substitute certificate. The substitute certificate is used as a replacement for the certificate chain. The substitute certificate is useful for authentication of the principal. In one embodiment, an authentication server exchanges the certificates. The substitute certificate is signed by the authentication server and used for authentication and communication with principals that have knowledge of and trust the authentication server.

In general, in one aspect, the invention relates to a method for exchanging a plurality of certificates that together can be used to certify a principal's public key for a single substitute certificate. The method includes receiving a plurality of certificates. One of said plurality of certificates includes the principal's public key and a signature. The method includes verifying each of the plurality of certificates. The method includes issuing a single substitute certificate certifying the principal's public key.

Embodiments of this aspect of the invention include the following features. In one embodiment, the signature is the signature of a certification authority, that is signed using the certification authority's private key. In another embodiment, each certificate includes a serial number, an issuer name, and expiration time, and an algorithm identifier. In another embodiment, each certificate satisfies the X.509 standard. In another embodiment, the single substitute certificate has a relatively short expiration period. In another embodiment, a plurality of certificates are received from a principal. In another embodiment, a single certificate is received from a principal and at least one other certificate is received from a certificate server. In another embodiment, verifying a certificate includes authenticating the digital signature that signed each certificate. Verifying can also include checking for each certificate in an appropriate certificate revocation list and determining that the certificate has not been revoked.

In another embodiment, the method also includes determining the principal's access privileges, and the single substitute certificate certifies the principal's public key and lists the principal's access privileges. In one such embodiment, the principal's access privileges are determined by authenticating the signature on a privilege attributes certificate and determining that the privilege attributes certificate has not expired. In another embodiment, the privilege attribute certificate is received from a server.

In general, in another aspect, the invention relates to a method for exchanging a plurality of certificates certifying a principal's public key for a single certificate. The method includes transmitting a plurality of certificates, each certificate comprising the principal's public key and a signature, and receiving a single substitute certificate certifying the principal's public key.

In general, in another aspect, the invention relates to a system for exchanging a plurality of certificates certifying a principal's public key for a single certificate. The system includes a receiver receiving a plurality of certificates, each certificate comprising the principal's public key and a signature. The method also includes a verification module for verifying each of the plurality of certificates. The method also includes a certification module for issuing a single substitute certificate certifying the principal's public key.

Embodiments of this aspect of the invention include the following features. In one embodiment, the signature includes the signature of a certification authority on the certificate using the certification authority's private key. In another embodiment, each certificate further comprises a serial number, an issuer name, and expiration time, and an algorithm identifier. In another embodiment, each certificate satisfies the X.509 standard. In another embodiment, the single substitute certificate has a relatively short expiration period. In another embodiment, the verification module includes a comparitor checking for each certificate in an appropriate certificate revocation list and verifying that the certificate has not expired, and an authenticator for authenticating the digital signature used to sign each certificate.

In another embodiment, the system also includes a receiver for receiving a privilege attributes certificate for the principal, the privilege attributes certificate listing the principal's access privileges. The system also includes a verification module for verifying the privilege attributes certificate by authenticating the signature on the privilege attributes certificate and determining that the privilege attributes certificate has not expired. The certification module issues a single substitute certificate certifying the principal's public key and listing the principal's access privileges. In another embodiment, a receiver receives access information for the principal that describes the principal's access privileges, and the certification module issues a single substitute certificate certifying the principal's public key and listing the principal's access privileges.

In general, in another aspect, the invention relates to a system for exchanging a plurality of certificates certifying a principal's public key for a single certificate. The system includes a transmitter for transmitting a plurality of certificates, each certificate comprising the principal's public key and a signature. The system also includes a receiver for receiving a single substitute certificate certifying the principal's public key.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
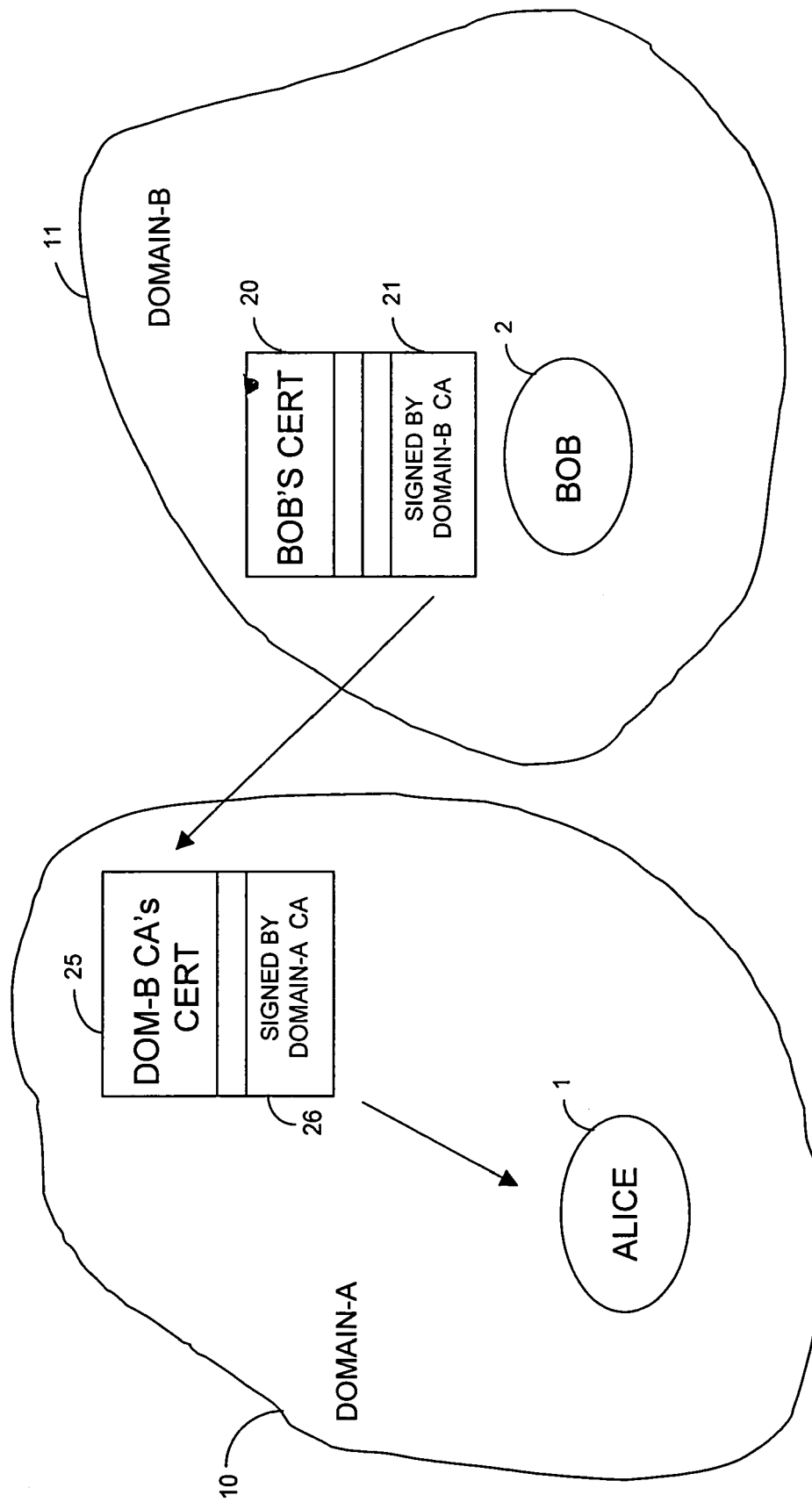
FIG. 1 illustrates a simple certificate chain according to the prior art.
Figure 2:
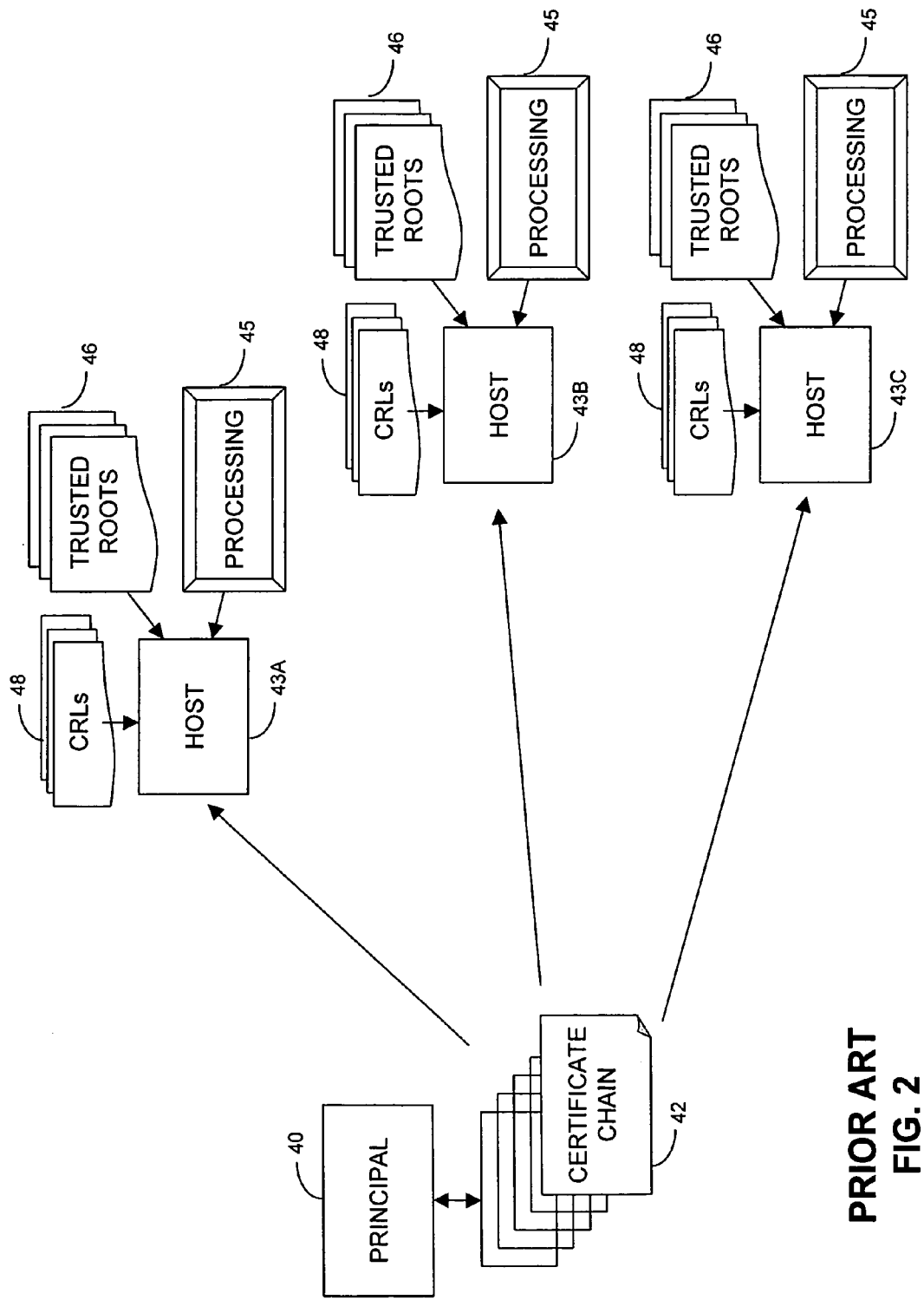
FIG. 2 is an example of a system according to the prior art.
Figure 3:
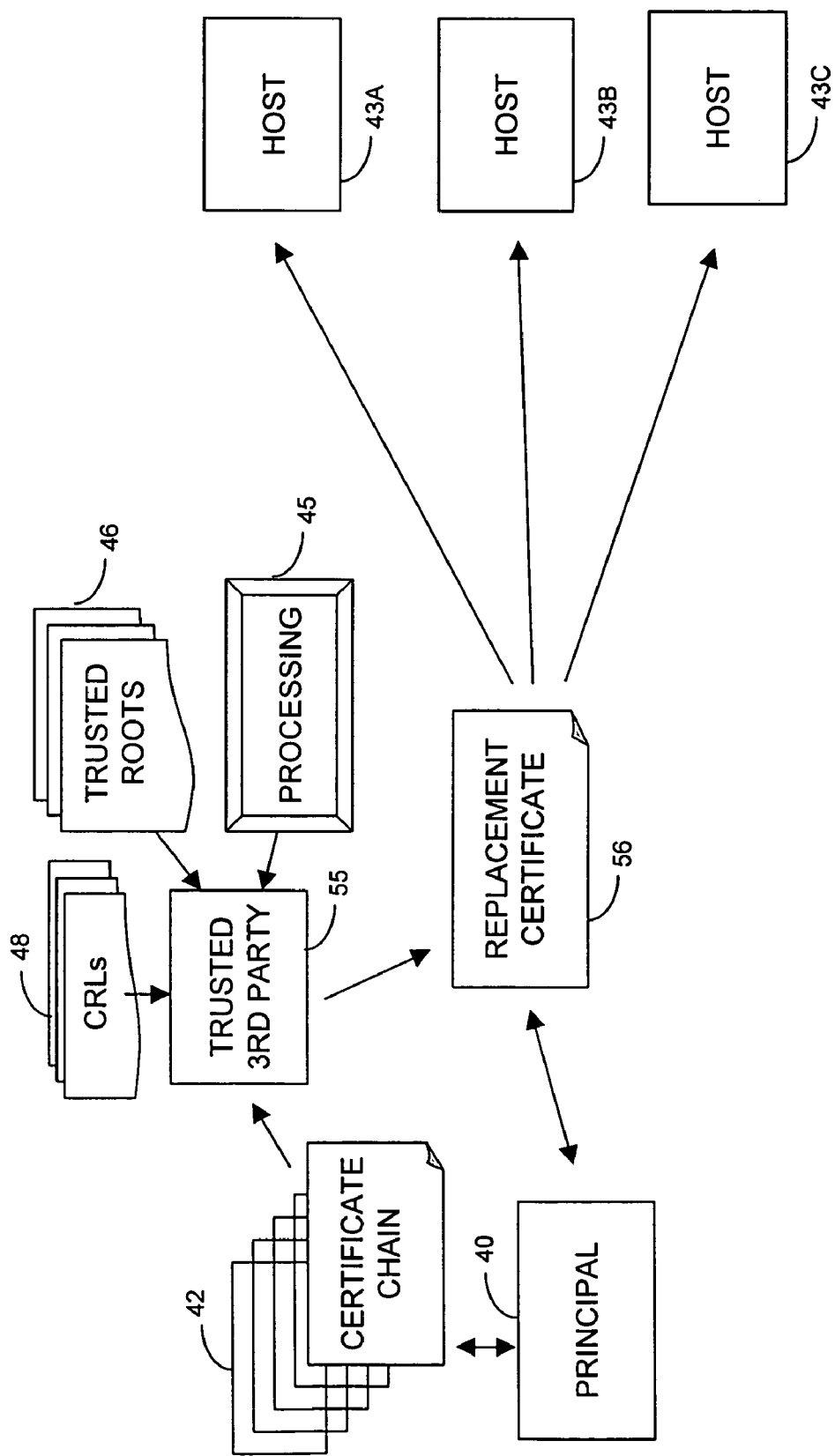
FIG. 3 is a block diagram of an example of an embodiment of a system according to the invention.
Figure 4:
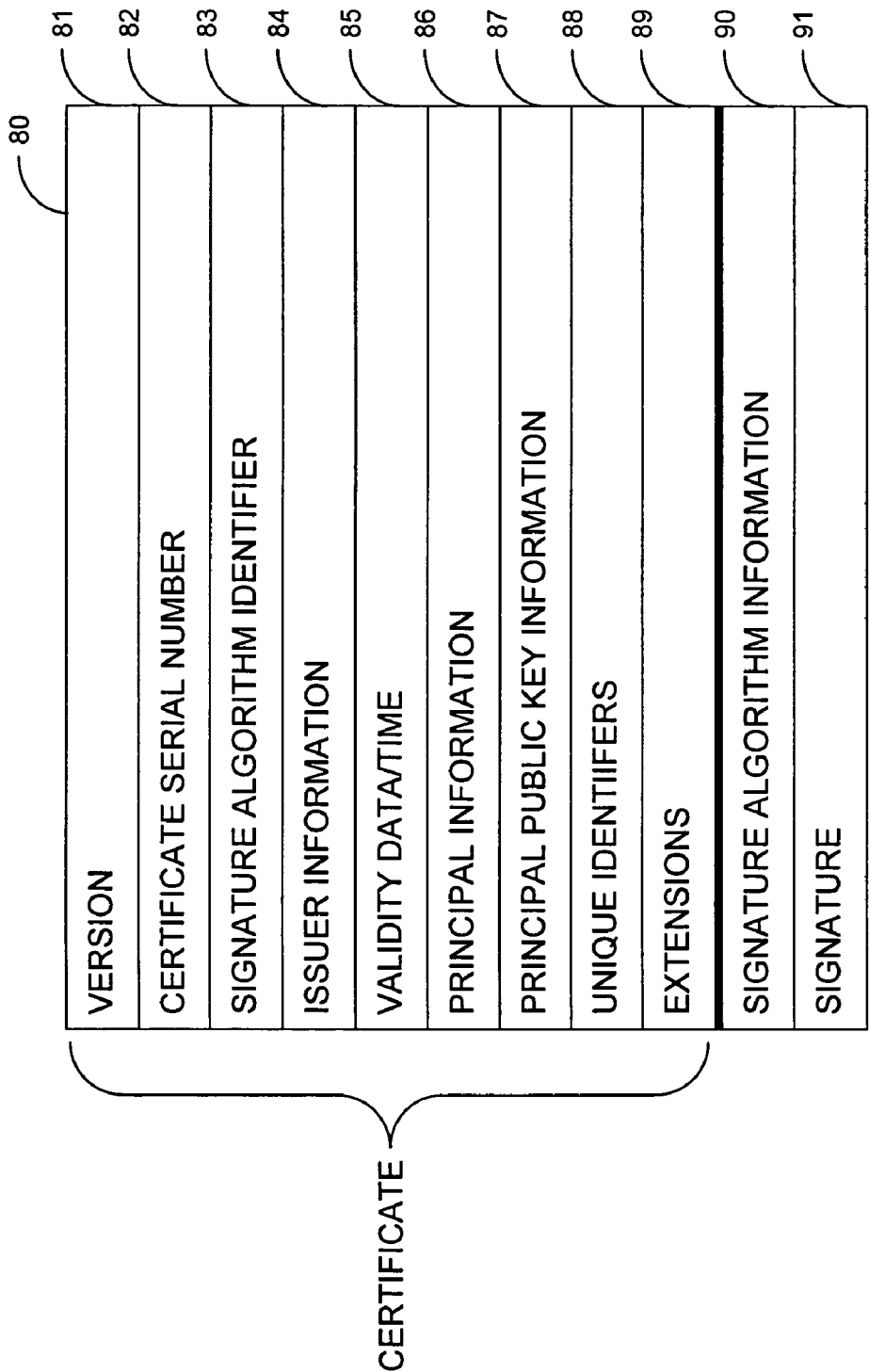
FIG. 4 is a block diagram of a certificate as described in the X.509 standard.

Referring to FIG. 4, certificates that can be used with the invention include various types of certificates that provide a binding between a principal, who is generally identified by a principal name 86, and a public key 87. One type of certificate is defined by the X.509 specification. A short summary of the information in an X.509 certificate is provided to explain by example what a certificate is, and also to provide examples of the type of information that can be included in a certificate. The invention is not intended to be limited to the X.509 format, or to any particular type or format of certificate.

A certificate 80 according to the X.509 specification includes a version number 81 that describes the version of the encoded certificate. In one embodiment, the version identifier is an integer, which is a value of 2 for version 3, and value of 1 for version 2. The value is omitted from the certificate for version 1.

A certificate serial number 82 is an integer assigned by a certificate issuer to each certificate. The certificate number 82 is intended to be unique such that the issuer name information 84 and the serial number 82 together are a unique identifier for a certificate.

A signature algorithm identifier 83 defines the algorithm used to generate the signature. Examples of signature algorithms supported by X.509 are MD2 with RSA encryption, MD5 with RSA encryption, SHA-1 with RSA encryption, and SHA-1 with DSA.

Issuer information 84 identifies the entity that has signed and issued the certificate. In X.509, the issuer information contains a non-empty distinguished name. The issuer information can include a list of various issuer attributes and corresponding information. Examples of such an attribute and information are country name, and United States.

Validity information 85 describes the time interval during which the certificate issuer warrants that it will maintain information about the status of the certificate. The field is represented as a sequence of two date/time pairs, the date/time on which the certificate validity begins (i.e. a "not before" field) and the date/time on which the certificate validity ends (i.e. a "not after" field).

Principal information 86 identifies the principal associated with the public key stored in the public key information 87. In X.509, if principal information 86 is included, it is a distinguished name according to the X.500 specification. Additional information about the principal may also be included in the extensions field 89. For example, an alternative name may be provided that is not in X.500 format.

Public key information 87 includes the principals public key and also identifies the algorithm with which the key is to be used. The public key will be a number of a particular length, depending on the algorithm specified.

Unique identifiers 88 are used in some implementations, in case issuer names or principal names are reused. Extensions 89, which are additional fields, may be included in the certificate to provide additional information. The extensions appear as a sequence of one or more certificate extensions.

Signature algorithm information 90, like the identifier 83 in the certificate, defines the algorithm used to generate the signature. This field 90 also includes any optional parameters necessary for signature calculation, for example salts. The content of the optional parameters varies according to the algorithm identified.

The signature value 91 contains a digital signature computed upon the encoded certificate values 81-89. The certificate values are used as the input to the signature function identified in the signature algorithm information 90, and using any parameters provided in that section. The signature value is encoded as a bit string and included in the certificate's signature field 91. By generating this signature, the signer certifies the validity of the information in the certificate field. In particular, the signer certifies the binding between the principal information 86 and the public key information 87—that is that the public key 87 belongs to the principal 86.

Figure 5:
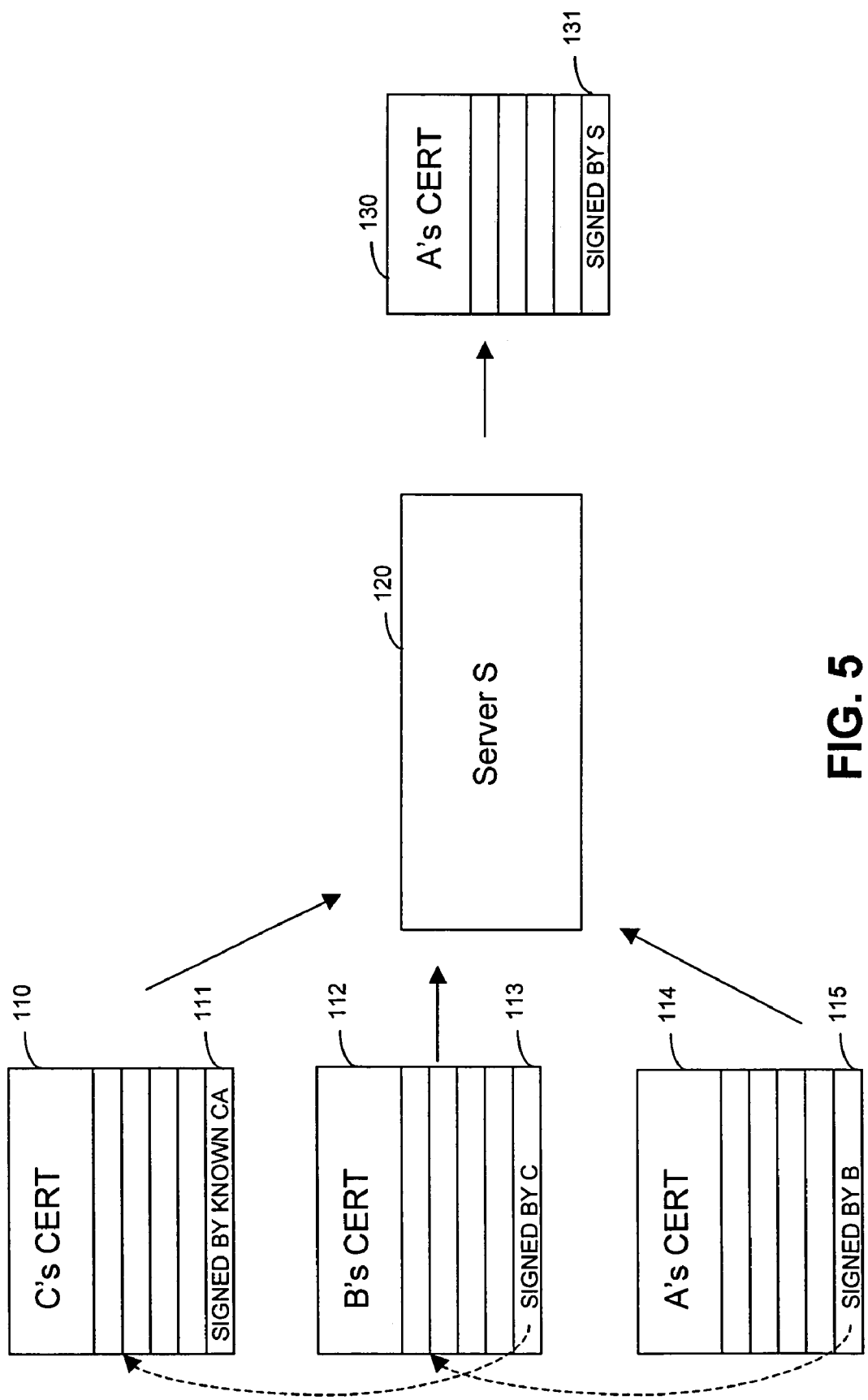
FIG. 5 is a block diagram of an embodiment of a system for certificate exchange according to the invention.

Referring to FIG. 5, a principal, such as server S 120 receives multiple certificates 110, 112, 114, are a certificate chain for a particular principal, in this example principal A. Three certificates are shown in the figure as an example and not to limit the invention to any particular number of certificates. In this example, A's certificate 114 is signed 115 by B, B's certificate 112 is signed 113 by C, and C's certificate 110 is signed 111 by a known trusted party, such as a CA. The server S 120 verifies A's public key by verifying the certificates 110, 112, 114.

In one embodiment, the certificates 110, 112, 114 are transmitted by principal A to the server S 120. In another embodiment, A transmits A's certificate, and the server S 120 determines that it needs B's certificate, and then C's certificate. The server S requests these certificates from one or more principals, which may or may not be associated with B's or C's certificate authorities. These principals transmit the certificates to the server S. In another embodiment, the certificates are transmitted to the server S when they are created. In other embodiments, depending on security system design, and the role of server S in the domain and the network, the certificates are transmitted to server S at various times.

To verify A's certificate 114, the server S 120 verifies the digital signature 115 on A's certificate 114. In this example, A's certificate 114 is signed by B. The server S 120 verifies B's signature 115 on A's certificate 114 by analyzing B's certificate 112. B's certificate 112 contains B's public key, and possibly other information. The server S determines that A's certificate 114 was, in fact, signed with the private key associated with the public key presented in B's certificate 112. The server S 120 then verifies the signature 113 on B's certificate 112.

In this example, B's certificate is signed 113 by C. The server S 120 verifies C's signature 113 on B's certificate 112 by analyzing C's certificate 110. C's certificate 110 contains C's public key, and possibly other information. The server S 120 determines that B's certificate 112 was in fact signed with the private key associated with the public key presented in C's certificate 110. The server S 120 then verifies the signature 113 on C's certificate 110. In this example, C's certificate was signed 111 by a principal whose public key is known to the server S 120, for example the CA of the local domain.

Server S, having verified the signatures on the certificates, may also take other steps to verify the certificates. For example, in some implementations, server S will check the CRL's associated with the certificates 110, 112, 114, to verify that the certificates 110, 112, 114 have not been revoked. As another example, if a certificate 110, 112, 114 includes an expiration date, the server will verify that the certificate has not expired.

Thus, the server S verifies A's certificate, B's certificate, and C's certificate. Having verified the certificates, the server S 120 then issues a new certificate 130 for principal A that is signed by the server S 131. This certificate can be used by principals that know server S's public key. Those principals can use the certificate issued by S to authenticate A, instead of verifying the certificate chain that the principal would have to verify. If the implementation requires checking CRL's, this overhead savings can be quite significant.

In one embodiment, the certificate 130 issued by server S has a relatively short-term expiration date/time, for example, three hours, or as another example, one day. Generally, such a short expiration time period reduces or eliminates the need for CRL's. Eliminating the need to check one or more CRLs significantly decreases the overhead to verify a certificate.

Figure 6:
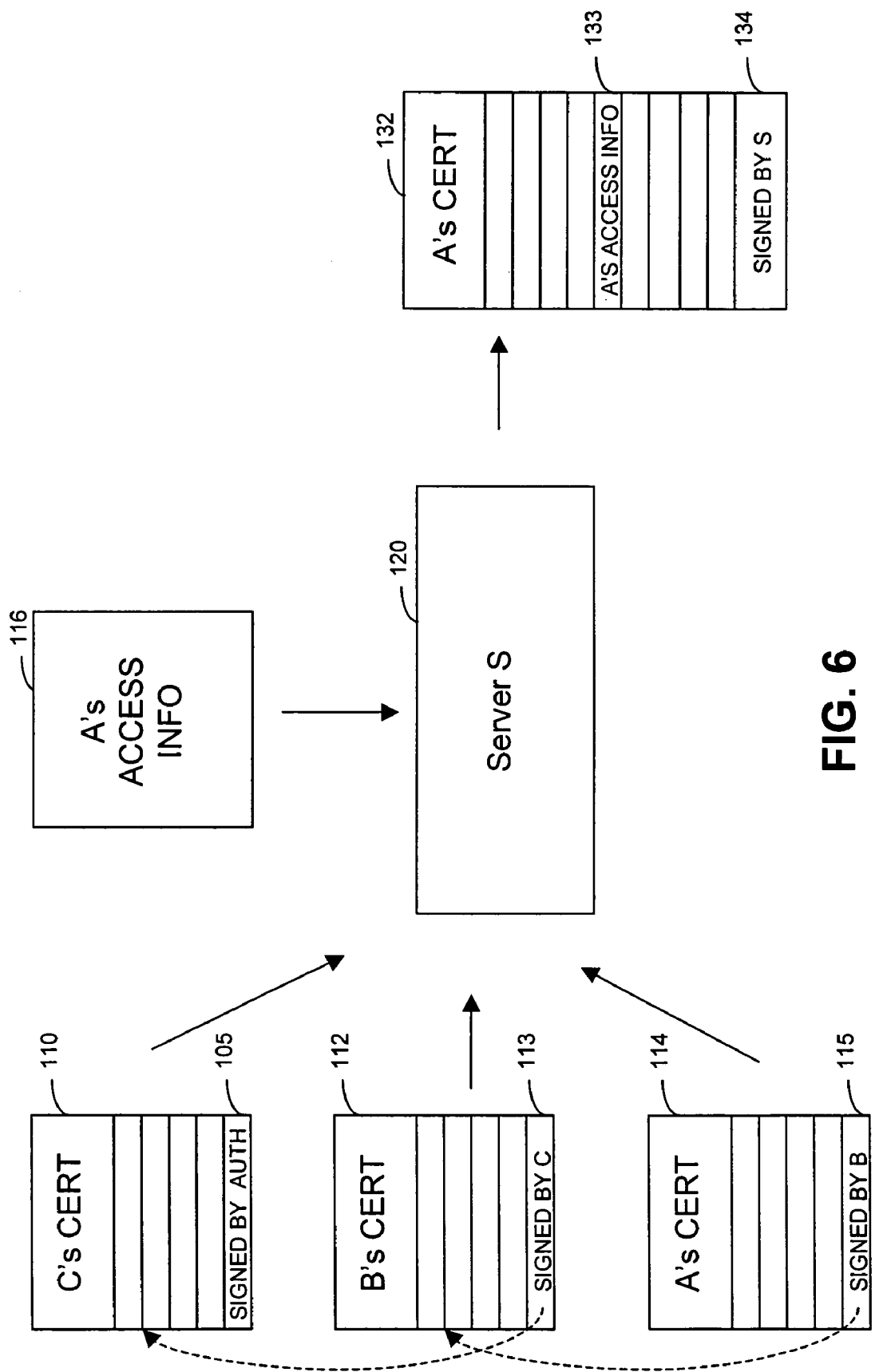
FIG. 6 is a block diagram of another embodiment of a certificate exchange system according to the invention that includes access information.

Referring to FIG. 6, in another embodiment, the server S 120 also receives and/or stores access information 116 about the principal (A in this example). In one embodiment, the access information includes information about files, file systems, and directories that the principal can access or cannot access. In yet another embodiment, the access information 116 includes information about computer systems that the principal may access or may not access.

In one embodiment, the access information 116 is in the form of a privilege attribute certificate. A privilege attribute certificate is a message that describes a principal's access privileges and is signed by a principal. In one embodiment, the privilege attribute certificate includes a principal identifier, the principal's access information, and a signature. In one such embodiment, the privilege attribute certificate also includes such information as a serial number, issuer identifier information, validity date/time information, principal information, and signature algorithm information as well.

The server S 120 receives the access information 116 as well as the certificates 110, 112, 114, and issues a certificate 132 that is signed by server S that includes principal A's public key as well as the access information 133. Thus, combined into one credential is both a principal identity and public key information binding as well as access information. In one embodiment, principal A receives the one digital credential 132 that certifies both his public key (i.e. his identity) and his access privileges and is signed by the server S 120. In another embodiment, the credential 132 is stored on a server, such as server S 120, and can be requested by other principals. In a system such as the embodiment of FIG. 6, the server S 120 can issue the single certificate 132, because each principal that trusts the server S to provide authentication information will also trust it to provide access information. In one embodiment, this certificate 132 issued by server S has a relatively short-term expiration date/time, for example, three hours, or as another example, one day.

Figure 7:
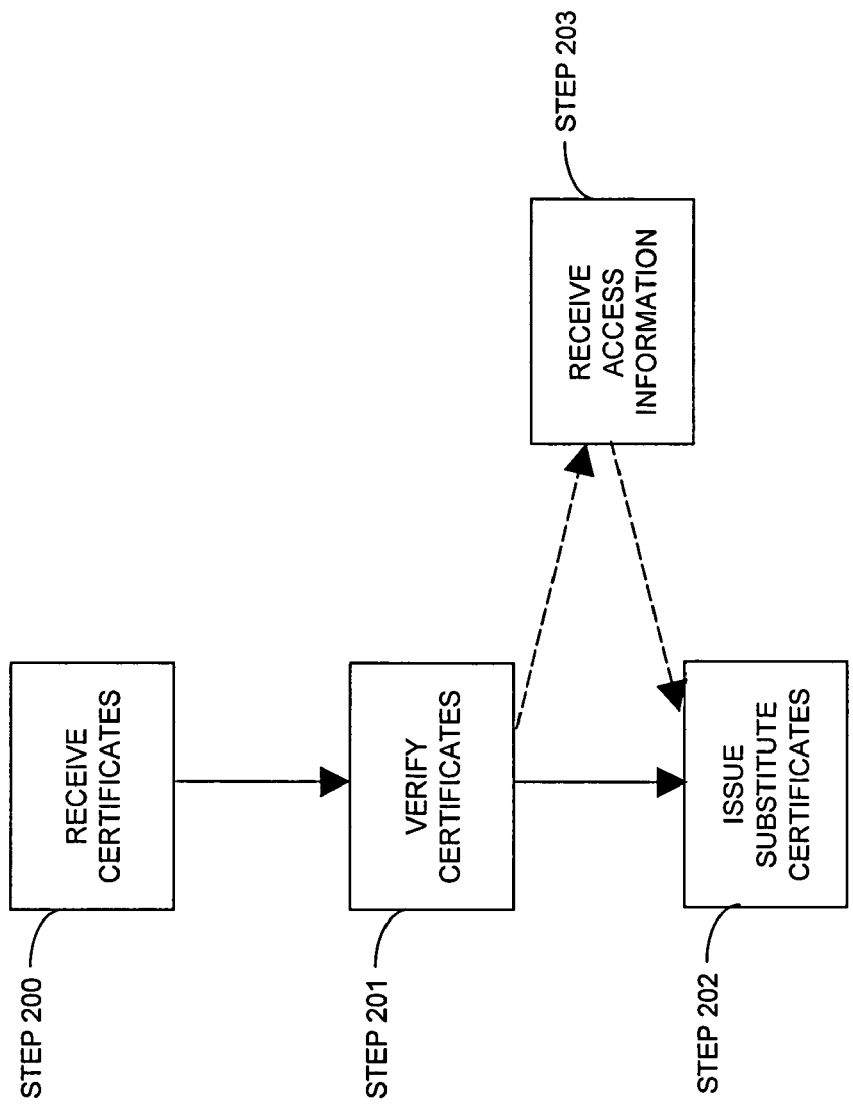
FIG. 7 is a flowchart of a method for certificate exchange according to the invention.

Referring to FIG. 7, an embodiment of a method for exchanging one or more certificates certifying a principal's public key includes receiving the certificates (STEP 200). In various embodiments, the certificates are received at the same time, or at different times, from the same source, or from different sources. In one embodiment, the certificates include a principal's public key and a signature. In one such embodiment, each certificate includes a serial number, an issuer identifier, an expiration time, and an algorithm identifier.

Each of the plurality of certificates is verified (STEP 201). In one embodiment, the verification includes authenticating the digital signature that signed the certificate, checking for the certificate in a certificate revocation list, and determining that the certificate has not been revoked. In another embodiment, the verification includes determining that the certificate has not expired.

A substitute certificate is issued (STEP 202). In one embodiment, the substitute certificate is used (by principals) instead of the one or more certificates received in STEP 200. In one embodiment, the substitute certificate can be used to authenticate a principal, or to certify a principal's public key.

In one embodiment, an additional step (STEP 203) is included in the method, in which access information about the principal whose public key is to be certified is also received. This step can be performed before or after the certificates are received (STEP 200) and verified (STEP 201). As shown in the figure, in one embodiment the access information is received after the certificates are verified. In one embodiment, the access information is received in the form of a privileges attributes certificate. In one such embodiment, the access information is verified by verifying the expiration date and signature on the privileges attribute certificate. In another embodiment, the access information is received in the form of a file access from a server.

Figure 8:
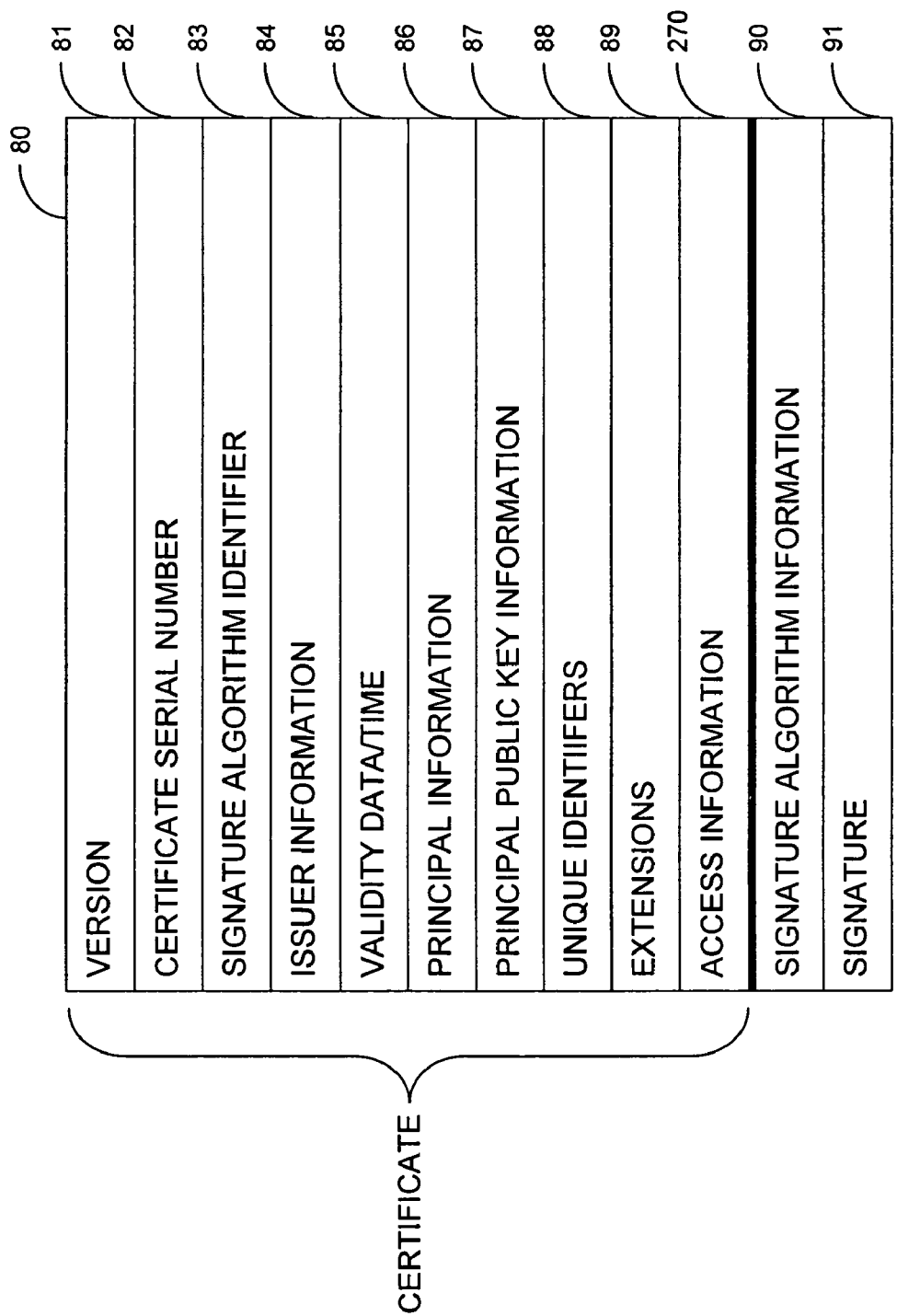
FIG. 8 is block diagram of a certificate including access information according to the invention.

Referring to FIG. 8, in one embodiment, a substitute certificate 250 includes the information described in the certificate of FIG. 4, and also includes access information 270. The access information is part of the certificate, and so it is signed by the certificate issuer (the server S in the embodiment of FIG. 6). By including the access information with the certificate, a principal that receives the certificate can authenticate the principal, and also determine that principal's access privileges. This incorporation of access information into the authentication certificate provides benefits of economy and efficiency. In one embodiment, the access information is included as an extension 89 to the certificate. In another embodiment, the access information is included in addition to the extensions 89.

Figure 9:
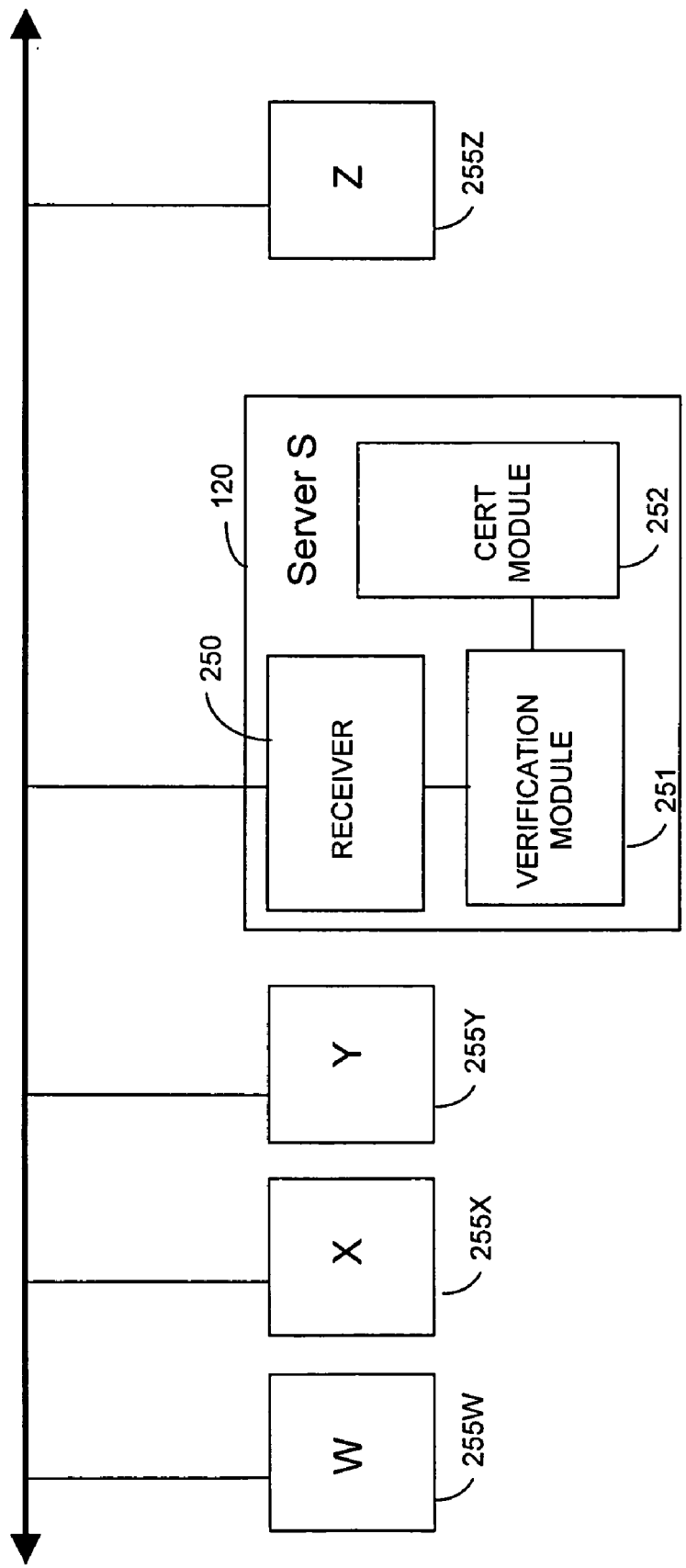
FIG. 9 is a block diagram an embodiment of a system according to the invention.

Referring to FIG. 9, an embodiment of an authentication server S 120 is implemented as software running on a general-purpose computer. The general purpose computer includes at least one processor, such as a PENTIUM processor available from Intel Corporation of Santa Clara, Calif., or a POWER PC processor available from Motorola, Inc. of Schaumburg, IL. The general purpose computer can include memory (e.g. RAM, ROM) and data storage interfaces to a hard disk, CDROM, etc., and one or more interfaces to input/output devices such as a floppy disk, computer network, keyboard, video monitor, mouse, serial ports, etc. In one embodiment, the authentication server S 120 runs a commercially available operating system such as LINUX or Microsoft Windows 95, 98, or NT.

In the embodiment of FIG. 9, the authentication server S 120 is on a network that allows the server 120 to connect with principals W 255W, X 255x, Y 255Y, and Z 255Z, generally 255. The number of principals shown is intended to be illustrative and not to limit the invention to any particular number. In one embodiment the computer network is an ethernet network, and the principals communicate using TCP/IP protocol. In other embodiments, other types of networks and networking protocols are used.

In one embodiment, the authentication server S 120 includes a receiver 250. In one embodiment, the receiver is a software module of the authentication server 120 running on a general purpose computer. In another embodiment, the receiver is implemented in special-purpose hardware. The receiver receives certificates. In one embodiment, the receiver includes software to communicate with one or more of the principals 255 to receive the certificates. In another embodiment, the receiver is capable of requesting and receiving the certificates from one or more certificate servers. In other embodiments, the receiver otherwise receives the certificates. For example, in one embodiment, the receiver 250 receives the certificates from a data store on the general purpose computer on which the authentication server 120 runs.

The authentication server S 120 includes a verification module 251. In one embodiment, the verification module is a software module of the authentication server 120 running on a general purpose computer. In another embodiment, the verification module 251 is implemented in special-purpose hardware. The verification module verifies each of a plurality of certificates. In one embodiment, the verification module uses certificates and/or information about a principal's public key that is already stored in the server S 120. Other certificates and/or information is provided by the receiver 251. The verification module can request that the receiver 250 receive additional certificates in order to verify the signature on a certificate.

The authentication server S 120 includes a certification module 252. In one embodiment, the certification module 252 is a software module of the authentication server 120 running on a general purpose computer. In another embodiment, the certification module 252 is implemented in special-purpose hardware. The certification module issues a single substitute certificate certifying the principal's public key. In one embodiment, the single substitute certificate is signed using the authentication server's 120 private key.

In one embodiment, the receiver also receives privileges (i.e. attributes or access) information about a principal 255. The access information may be in the form of a PAC or in another format. In one embodiment, the receiver provides the authentication information to the verification module 251 for verification. The verified access information is passed on to the certification module for incorporation into the single substitute certificate.

In one embodiment, the authentication server S transmits the single substitute certificate to the principal 255. The principal 255 can then present the single substitute certificate to another principal for authentication or communication. In another embodiment, the authentication server stores the single substitute certificate, and provides the certificate upon request from a principal 255. In another embodiment, the principal transmits the certificate to a certificate server (not shown) for storage and retrieval by one or more principals. In other embodiments, the single substitute certificate is provided in other ways to the principals.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method performed by a trusted party for exchanging a plurality of certificates together certifying a principal's public key for a single substitute certificate, comprising the steps of:

receiving a plurality of certificates each comprising a respective public key and signature of a corresponding distinct certificate signer;

determining whether the plurality of certificates forms a certification chain that begins with a root certificate and ends with a final certificate, wherein (1) the certificate signer for the root certificate is trusted by the trusted party, and the respective certificate signers for all the certificates except the root certificate are not required to be trusted by the trusted party, and (2) each certificate in the chain, starting with the root certificate, is unexpired and attests for the validity of a subsequent certificate in the chain, and wherein only the final certificate attests to the validity of the principal's public key; and only if the plurality of certificates forms such a certificate chain, then subsequently issuing a single substitute certificate signed by the trusted party and certifying the principal's public key, in exchange for the plurality of certificates.

2. The method of claim 1 wherein the signature on at least the final certificate comprises the signature of a certification authority on the certificate using the certification authority's private key.

3. The method of claim 1 wherein each certificate further comprises a serial number, an issuer name, and expiration time, and an algorithm identifier.

4. The method of claim 1 wherein each certificate satisfies the X.509 standard.

5. The method of claim 1 wherein the single substitute certificate has a relatively short expiration period.

6. The method of claim 1 wherein the receiving step comprises receiving a plurality of certificates from a principal.

7. The method of claim 1 wherein the receiving step comprises receiving a single certificate from a principal and receiving at least one other certificate from a certificate server.

8. The method of claim 1 wherein the verifying step comprises:
   authenticating the digital signature that signed each certificate;
   checking for each certificate in an appropriate certificate revocation list; and
   verifying that the certificate has not been revoked.

9. The method of claim 1 wherein the method further comprises the step of determining the principal's access privileges;
   and wherein the issuing step comprises issuing a single substitute certificate certifying the principal's public key and listing the principal's access privileges.

10. The method of claim 9, wherein the determining step comprises: verifying a privilege attributes certificate by authenticating the signature on the privilege attributes certificate and determining that the privilege attributes certificate has not expired.

11. The method of claim 10 wherein the determining step comprises: receiving the privilege attributes certificate from a server.

12. A system including a trusted party for exchanging a plurality of certificates together certifying a principal's public key for a single certificate, comprising:
   a receiver receiving a plurality of certificates, each comprising a respective public key and a signature of a corresponding distinct certificate signer;
   a verification module for determining whether the plurality of certificates forms a certification chain that begins with a root certificate and ends with a final certificate, wherein (1) the certificate signer for the root certificate is trusted by the trusted party, and the respective certificate signers for all the certificates except the root certificate are not required to be trusted by the trusted party, and (2) each certificate in the chain, starting with the root certificate, is unexpired and attests for the validity of a subsequent certificate in the chain, and wherein only the final certificate attests to the validity of the principal's public key; and
   a certification module operative, only if the plurality of certificates forms such a certificate chain, to issue a single substitute certificate signed by the trusted party and certifying the principal's public key, in exchange for the plurality of certificates.

13. The system of claim 12 wherein the signature on at least the final certificate comprises the signature of a certification authority on the certificate using the certification authority's private key.

14. The system of claim 12 wherein each certificate further comprises a serial number, an issuer name, and expiration time, and an algorithm identifier.

15. The system of claim 12 wherein each certificate satisfies the X.509 standard.

16. The system of claim 12 wherein the single substitute certificate has a relatively short expiration period.

17. The system of claim 12 wherein the verification module comprises:
   a comparator for checking for each certificate in an appropriate certificate revocation list and verifying that the certificate has not expired; and
   an authenticator for authenticating the digital signature that signed each certificate.

18. The system of claim 12 wherein the system further comprises:
   a receiver receiving a privilege attribute certificate for the principal, the privilege attribute certificate describing the principal's access privileges; and
   a verification module for verifying the privilege attribute certificate by authenticating the signature on the privilege attribute certificate and determining that the privilege attribute certificate has not expired;
   and wherein the certification module issues a single substitute certificate certifying the principal's public key and listing the principal's access privileges.

19. The system of claim 12 wherein the system further comprises:
   a receiver receiving access information for the principal, the access information describing the principal's access privileges; and
   and wherein the certification module issues a single substitute certificate certifying the principal's public key and listing the principal's access privileges.

* * * * *